Sept. 2, 1958    M. B. RASMUSSON    2,850,148
FROZEN CONFECTION DISTRIBUTOR
Filed July 3, 1956    2 Sheets-Sheet 1
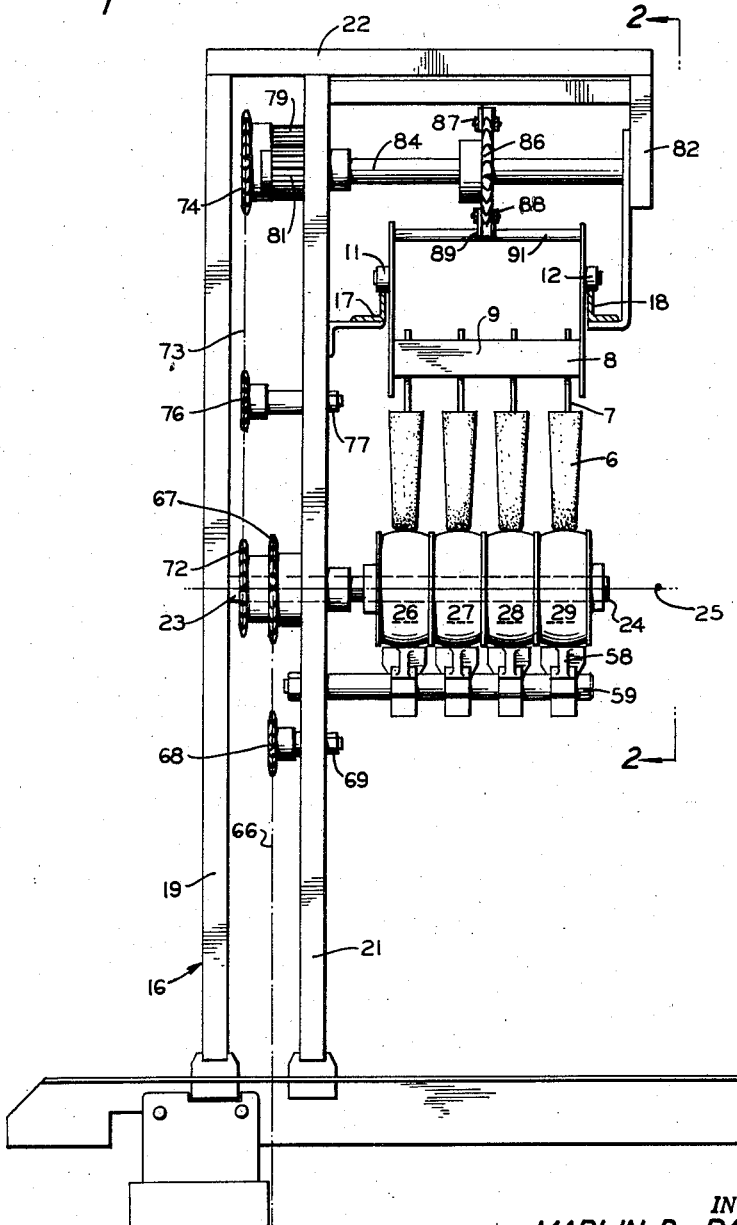
INVENTOR.
MARLIN B. RASMUSSON
BY Lothrop & West
ATTORNEYS

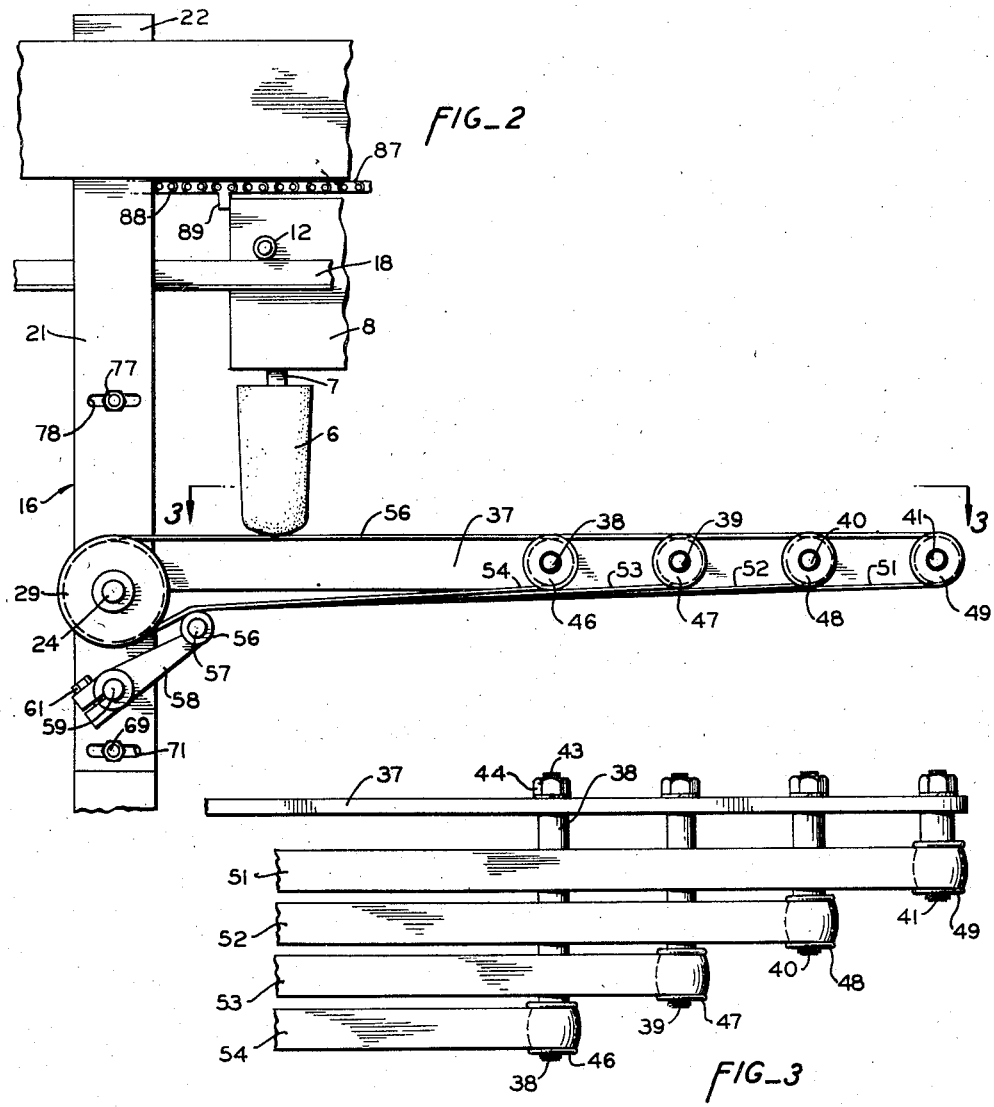

United States Patent Office 2,850,148
Patented Sept. 2, 1958

2,850,148

FROZEN CONFECTION DISTRIBUTOR

Marlin B. Rasmusson, Sacramento, Calif., assignor to Vitafreze Equipment, Inc., a corporation Application July 3, 1956, Serial No. 595,669

6 Claims. (Cl. 198—160)

The invention relates to means especially useful in the handling of frozen confections on sticks and has especially to do with the handling of groups of such stick confections as they are being transferred toward a mechanism for packaging them. A structure of this general type is well disclosed in the Anderson Patent 2,355,500 of August 8, 1944, entitled "Confection Packaging Machine." In the Anderson machine there is a distributing mechanism utilizing a number of belts for conveying the frozen confections toward a packaging structure. While these belts are satisfactory for many purposes they and the accompanying mechanism are not particularly susceptible to maintenance of the high degree of sanitation which is requisite for handling food products such as frozen confections and are also susceptible of improvements in other particulars.

It is therefore an object of my invention to provide a frozen confection distributor which is easily and readily disinfected and cleaned and in which the highest degree of sanitation may be readily and easily maintained.

Another object of the invention is to provide a frozen confection distributor which is easily and promptly serviced.

Another object of the invention is to provide a frozen confection distributor in which the various parts in contact with the frozen confections are readily available to visual inspection not only when shut down but also during operation.

Another object of the invention is to provide a frozen confection distributor which is in general an improvement over comparable devices heretofore known.

Other objects together with the foregoing are attained in the embodiment of the invention described in the accompanying description and illustrated in the accompanying drawings in which:

Figure 1 is an end elevation of part of a confection packaging machine showing especially the frozen confection distributor in end elevation, part being in cross-section and other parts being omitted to simplify the figure.

Figure 2 is a side elevation, the plane of the elevation being indicated by the line 2—2 of Figure 1 and various parts being omitted or being broken away to simplify the disclosure.

Figure 3 is a fragmentary plan, the plane of view being indicated by the line 3—3 of Figure 2.

While the frozen confection distributor of the invention can be embodied in a number of varying forms depending upon its environment and other factors, it has been successfully incorporated in a practical machine substantially as shown herein.

In this instance, the frozen confection distributor is primarily for use with confections on sticks each of which is inclusive of a water ice or ice cream body frozen on a wooden stick 7 generally disposed centrally of the body. For handling in bulk, these confections are suspended from a stick holder 8 which has a gripping mechanism 9 (diagrammatically illustrated) effective either to grip the sticks tightly so that the confections 6 are supported in depending position therefrom or to grip the sticks loosely so that while they are no longer held from falling they are maintained in their relative arrangement and may be transported laterally. The stick holder 8 is a standard item well described in the literature and so is not described or illustrated in detail herein, save to say that it is provided with lateral rollers 11 and 12 at appropriate points for suspending and guiding it. Customarily, the confections 6 are arranged in each stick holder with the sticks substantially four abreast or in four rows with the confections in files ordinarily with six confections in each file.

The stick holder 8 is supported on a frame 16. For example, this can be part of a confection packaging machine. The stick holder is supported therein on parallel rails 17 and 18 which guide the stick holder in a selected, predetermined path usually substantially horizontal in this section of the device. The stick holder moves from the left hand portion of Figure 2 toward the right hand portion in the usual installation.

In this part of the apparatus the confections 6 are advanced and are also released from the gripping action of the stock holder. To assist in this operation there is preferably included mechanism in accordance with this invention. To that end the frame 16 is supplemented by uprights 19 and 21 parallel to each other and joined at the upper part of the machine by a cross member 22.

At a convenient point on the frame 16 and at a selected height on the uprights 19 and 21 is situated a shaft 23. This shaft is journalled in the uprights and is cantilevered therefrom so as to have an extending portion 24 which projects for a substantial distance. The shaft 24 is provided with a plurality of pulleys 26, 27, 28 and 29 fixed thereon by any suitable means so that the pulleys rotate in synchronism with the rotation of the shaft 23 about the shaft axis 25.

Also disposed on a part of the frame 16 constituted by a support 37 are individual spindles 38, 39, 40 and 41. These spindles are preferably provided with reduced threaded portions 43 and are anchored in place by nuts 44 so that the various spindles are firmly fixed on the frame extension 37. The spindles are spaced uniformly apart with respect to each other and are spaced at varying distances from the shaft 23. Each of the spindles is provided with one of a number of rollers 46, 47, 48 and 49 journalled on the spindles for free rotation about the spindle axes. The spindles, being anchored at one end, are in effect cantilevered from the support 37 and carry the rollers at their projecting ends. Preferably the spindles are of progressively diminishing length as they are successively greater distances from the shaft 23. The individual rollers are in alignment with the individual pulleys the arrangement being such that the roller 49 closest to the frame 37 and farthest from the shaft 23 is in alignment with the pulley 26 while the roller 46 closest to the shaft 23 and farthest from the frame 37 is in alignment with the pulley 29, the intervening rollers and pulleys being in alignment in the same stepped relationship.

Pursuant to the invention, the aligned rollers and pulleys are provided with suitable endless belts 51, 52, 53 and 54. These belts are trained round the various rollers and pulleys in such a fashion that the upper surfaces 56 of all of the belts are substantially coplanar and approximately horizontal being parallel with the path of advancement of the stick holder 8 on the tracks 17 and 18. Because of the arrangement and mounting of the various pulleys and of the rollers, installation is a simple matter of slipping the belt 51, for example, around the pulley 26 and around the roller 49. The belt is somewhat longer than the distance between the belt receiving members for ease in handling. The belt 51 can be put into position whether or not the other belts 52, 53 and 54 have already been placed. The same is true of the belt 52, of the belt 53 and of the belt 54. It is important to note that the belts are all fully visible and accessible and can be individually positioned and moved without disturbing any of the other structure.

Sometimes belts that are somewhat slack are used or sometimes after severe service initially tight belts stretch and become slack. For that reason each of the belts is provided with an individual idler wheel 56 which is one of a group of identical idler wheels. Each idler is journalled on its own short shaft 57 at the end of an arm 58 supported on a cross rod 59 extending from the upright 21. A clamp screw 61 permits the idler wheel 56 to be positioned as desired to insure the appropriate tension of its associated belt.

Pursuant to the invention all of the pulleys 26, 27, 28 and 29 are advanced simultaneously and in synchronism with the advancement of the stick holder 9 or carriage on the frame 16. For that reason a drive chain 66 emanating from any suitable source of driving power (not shown) is led around a sprocket 67 fast on the shaft 23. Any slack in the chain 66 is taken up by an adjustable idler 68 anchored by a nut 69 in a set position in a transverse slot 71 formed in the upright 21. The shaft 23 is thus rotated at the desired rate and through the belts rotates the idlers 46, 47, 58 and 59, respectively, the upper surface of the various belts traveling from left to right, as seen in Figure 2.

The drive is transmitted to the carriage 8 or stick holder. On the shaft 23 is mounted a sprocket 72 connected by a chain 73 to a sprocket 74. An idler 76 is secured by a nut 77 in an elongated adjusting slot 78 in the upright 21. Since the diameters of the sprockets 72 and 74 are not the same and since it is also desired to reverse the direction of motion imparted by the sprocket 74, the sprocket is joined to a gear 79 meshing with a gear 81 of an appropriate, different diameter so that the gear 81 turns at the same rotary speed as but in the opposite direction from the shaft 23. The gear 81 is fastened on a shaft 84 near one end journalled in the upright 21 and at the other end carried in a hanger 82 depending from the cross member 22.

The shaft 84 between its ends has fixed to it a sprocket 86 engaged by a chain 87. On the lower run 88 of the chain 87 are dogs 89 in a position to engage cross bars 91 on the stick holder carriage 8. Because the shafts 84 and 23 are appropriately connected together and are driven synchronously the dog 89 advances from left to right as shown in Figure 2 at the same rate as does the upper run of the various belts 51, 52, 53 and 54.

In the operation of this device, the structure is put into motion and as the stick holder carriage 8 is advanced over the frame 16 it grips and carries its various confections 6 at the same speed as the various belts but at a point slightly above the belts and out of contact therewith. By standard mechanism, not shown, the stick holder at a selected position of advance is released so that while the various sticks 7 are laterally and longitudinally confined they are no longer gripped and the confections 6 drop a short distance until they rest upon the individual belts 51, 52, 53 and 54. The confections rest approximately in the transverse center of each of the individual belts. Thus, as the sticks 7 are impelled forward by pressure near the top by the advancing stick holder carriage 8, the confections are impelled at the bottom by the advancing belts until such time as the confections run off the ends of the belts as they round their respective pulleys. Since the sticks 7 are not gripped by the stick holder the confections drop off the ends of the belts to a mechanism for subsequent treatment thereof.

After continued operation of the structure as described, the belts tend to acquire some of the material of the confections and possibly become contaminated in other ways. This is discernable by ready inspection at all times during the operation of the machine as all parts are visible. With this construction it is simple at any time upon stopping of the machine to loosen the idlers 56 sufficiently so that any one or all of the belts can be removed from the machine, cleaned and returned thereto without disturbing any of the rest of the mechanism and so that at the end of a day's run the entire structure can be dismounted for disinfecting and cleaning thoroughly with a small amount of labor. Furthermore, if anyone of the individual belts should break or otherwise fail during operation it is a simple matter to replace it without disturbing the other machinery.

What is claimed is:

1. A frozen confection distributor comprising a frame, means on said frame for supporting a carriage for movement in a selected path, said carriage having releasable means for suspending and guiding frozen confections in a plurality of rows, means on said frame for advancing said carriage in said path at a selected rate, a shaft rotatably mounted at only one end thereof in said frame at only one side of said frame, a plurality of pulleys fast on said shaft in alignment with said rows, a support on said frame at said one side of said frame, a plurality of spindles projecting from and mounted solely upon said support at different positions along said path, said spindles projecting from said support progressively decreasing amounts as they are progressively farther from said shaft, rollers on said spindles in respective alignment with said pulleys, belts trained around said pulleys and rollers with the upper surfaces of said belts in a plane parallel to said path and with individual ones of said belts below respective ones of said rows, and means for driving said belts substantially at said rate.

2. A frozen confection distributor comprising a frame, means on said frame for supporting a carriage for movement in a selected path, said carriage having releasable means for suspending and guiding frozen confections in a plurality of rows, means on said frame for advancing said carriage in said path, a shaft rotatably mounted in said frame and cantilevered therefrom on one side of said path, means for driving said advancing means and said shaft in synchronism, a plurality of pulleys fast on the cantilevered portion of said shaft in alignment with said rows, a plurality of spindles cantilevered from said frame on said one side of said path and at different distances from said shaft, said spindles projecting from said frame progressively decreasing amounts as they are progressively farther from said shaft, rollers on said spindles in respective alignment with said pulleys, and belts trained around said pulleys and rollers with the upper surfaces of said belts in a plane parallel to said path and with individual ones of said belts beneath respective ones of said rows.

3. A frozen confection distributor comprising a frame; means for advancing frozen confections on said frame in a selected path with said confections in rows; means for supporting said confections from below including a plurality of belts of different lengths, one for each row, individual ones of said belts being below respective ones of said rows, and means for supporting said belts including pulleys and rollers all fastened to said frame but only on the side of said frame adjacent the longest of said belts.

4. A frozen confection distributor comprising a frame, a shaft cantilevered from one side of said frame, a plurality of pulleys on said shaft, a plurality of spindles cantilevered from said side of said frame at different distances from said shaft, rollers on said spindles, the successive rollers being in progressive alignment with said pulleys, the roller nearest said shaft being in alignment with the pulley farthest from said side of said frame, and belts trained around said pulleys and rollers with the upper surfaces of said belts in a common plane.

5. A frozen confection distributor comprising a frame, a shaft cantilevered from one side of said frame, a plurality of pulleys on said shaft, means for rotating said pulleys in synchronism about the axis of said shaft, a plurality of rollers, means for cantilevering said rollers from said side of said frame for rotation about axes disposed at different distances from the axis of said shaft and with said rollers in alignment with said pulleys and with the rollers that are successively farther from said pulleys being progressively closer to said frame, and belts trained around said pulleys and rollers with the upper surfaces of said belts in a common plane.

6. A frozen confection distributor comprising a frame, a shaft at one end only journaled in and projecting from one side of said frame, pulleys fixed on the projecting portion of said shaft, a plurality of spindles at one end only mounted on and projecting from said side of said frame at different distances from said shaft, rollers on the projecting portion of said shafts, the roller farthest from said shaft being in alignment with the pulley closest to said frame and the roller closest to said shaft being in alignment with the pulley farthest from said frame, belts trained around the aligned rollers and pulleys and having their upper surfaces in a common plane, means on said frame for supporting frozen confections in rows with each row resting upon a respective one of said belts, and means for advancing said supporting means and the upper surfaces of said belts in synchronism.

References Cited in the file of this patent

UNITED STATES PATENTS

| | | |
|---|---|---|
| 2,355,500 | Anderson | Aug. 8, 1944 |
| 2,517,371 | Acton | Aug. 1, 1950 |
| 2,647,756 | Allersma | Aug. 4, 1953 |
| 2,659,503 | Otken | Nov. 17, 1953 |

FOREIGN PATENTS

| | | |
|---|---|---|
| 669,838 | Great Britain | Apr. 9, 1952 |